United States Patent
Stewart et al.

(10) Patent No.: US 9,798,550 B2
(45) Date of Patent: Oct. 24, 2017

(54) MEMORY ACCESS FOR A VECTOR PROCESSOR

(71) Applicant: NXP CANADA INC., Toronto (CA)

(72) Inventors: Malcolm Stewart, Ottawa (CA); Ali Osman Ors, Ottawa (CA); Daniel Laroche, Kemptville (CA)

(73) Assignee: NXP USA, Inc., Austin, TX (US)

( * ) Notice: Subject to any disclaimer, the term of this patent is extended or adjusted under 35 U.S.C. 154(b) by 935 days.

(21) Appl. No.: 13/737,290

(22) Filed: Jan. 9, 2013

(65) Prior Publication Data
US 2014/0195776 A1    Jul. 10, 2014

(51) Int. Cl.
| | |
|---|---|
| *G06F 9/30* | (2006.01) |
| *G06F 9/34* | (2006.01) |
| *G06F 9/38* | (2006.01) |
| *G06F 15/80* | (2006.01) |
| *G06F 9/345* | (2006.01) |

(52) U.S. Cl.
CPC .......... *G06F 9/3891* (2013.01); *G06F 9/3012* (2013.01); *G06F 9/345* (2013.01); *G06F 9/3824* (2013.01); *G06F 9/3887* (2013.01); *G06F 15/8061* (2013.01)

(58) Field of Classification Search
CPC ...... G06F 9/345; G06F 9/3887; G06F 9/3891; G06F 15/8061; G06F 15/8092; G06F 9/3824; G06F 15/8007
USPC .......................................... 712/27
See application file for complete search history.

(56) References Cited

U.S. PATENT DOCUMENTS

| | | | | |
|---|---|---|---|---|
| 6,480,927 B1 * | 11/2002 | Bauman | .............. | G06F 12/0813 710/306 |
| 2007/0118721 A1 * | 5/2007 | Stewart | ................... | G06F 7/575 712/15 |

* cited by examiner

*Primary Examiner* — Benjamin Geib

(57) ABSTRACT

A method and device for memory access in processors is provided. A processor, comprising a plurality of computational units, is capable of executing a single instruction on multiple pieces of data simultaneously (SIMD). A read operation is initiated to load data from memory into the plurality of computational units (CUs) arranged into a plurality of CU groups. The memory is arranged into a plurality of memory macro-blocks each associated with a respective CU group of the plurality of CU groups. For each CU group a respective first memory address is determined and for each CU group, the data in the associated memory macro-block is accessed at the respective first memory address.

19 Claims, 17 Drawing Sheets

Fig. 1 - Prior Art

MEMORY ACCESS FOR A VECTOR PROCESSOR

TECHNICAL FIELD

The current application relates to processors capable of executing an instruction on multiple pieces of data simultaneously and in particular to memory access in processors capable of executing an instruction on multiple pieces of data simultaneously.

BACKGROUND

Single instruction multiple data (SIMD) processors execute a single instruction on multiple pieces of data simultaneously. SIMD processors may comprise a plurality of computational units (CU) that receive a piece of the data and executes the instruction on the data.

FIG. 1 depicts a prior art SIMD processor and memory. The SIMD processor 100 comprises a plurality of computational units (CUs) 102a-l (referred to collectively as CUs 102) and a memory access control unit 104 that loads data into, and writes data out of, each of the CUs 102. As depicted, each CU operates on n-bits of data. The memory access control unit 104 can retrieve and/or store data into a vector memory 106. The vector memory 106 is capable of providing a vector block of data sufficient to load data into each of the CUs 102. As depicted, there are 12 CUs and as such, the vector memory can provide a vector of n×12 bits of data for a single memory address. The memory access control unit 104 can receive an address (Rn) 108 for either loading data from the vector memory or storing data to the vector memory. The memory access control unit 104 can load data into each of the CUs from the vector memory in a single read or write cycle. However, if different CUs 102 require data from different address locations, the data must be loaded from the vector memory in subsequent read/write cycles. As such, the memory access control unit 104 may provide a relatively simple implementation; however, the performance of providing data from separate addresses to different CUs 102 is low.

FIG. 2 depicts a further prior art SIMD processor and memory. The SIMD processor 200 is similar to the SIMD processor 100 and comprises a plurality of CUs 102 and a vector memory 206. However, rather than a single memory access control 104, the SIMD processor 200 comprises a plurality of memory access control units 204a-l (referred to collectively as memory control units 204). Each of the memory access control units 204 can receive an address 108 and retrieve and/or store data from the address. The memory access control units 204 may apply a respective offset to the base address (Rn) 108 in order to determine a respective address to load the data from or to. Unlike the vector memory 106, which could provide a vector of n×12 bits of data for a single address, the vector memory 206 is arranged to provide n bits of data, sufficient to load from or into a single CU, for a single address.

The memory access control units 100, 200 can provide data to individual CUs. However, the memory access control unit 100 may provide poor performance when different CUs require data to be loaded from different memory addresses. The memory access control units 200 can provide better performance, even if different CUs require data from different memory addresses; however, the individual memory access control units 204 increase the complexity of the processor 200, and increases the footprint required to provide the memory access control units 204.

It is desirable to have a processor capable of loading data into CUs while mitigating one or more problems associated with previous processors.

BRIEF DESCRIPTION OF THE DRAWINGS

Further features and advantages of the present disclosure will become apparent from the following detailed description, taken in combination with the appended drawings, in which.

DETAILED DESCRIPTION

In accordance with an aspect of the present disclosure there is provided a device comprising: a vector memory space divided into a plurality of memory macro-blocks for storing data; a vector processor comprising a plurality of computational units (CUs) for executing instructions, the plurality of CUs arranged into a plurality of CU groups, each CU group comprising two or more CUs of the plurality of CUs, the plurality of CUs providing execution of a single instruction on multiple pieces of data (SIMD); and a plurality of memory macro-block access units, each coupling a respective CU group to a respective associated memory macro-block, for controlling access of the CUs of the respective CU group to the associated memory macro-block.

In accordance with another aspect of the present disclosure there is provided a method comprising initiating a read operation for loading data from memory into a plurality of computational units (CUs) arranged into a plurality of CU groups, the memory arranged into a plurality of memory macro-blocks each associated with a respective CU group of the plurality of CU groups; for each CU group, determining a respective first memory address; and for each CU group, accessing the data in the associated memory macro-block at the respective first memory address.

Figure 1:
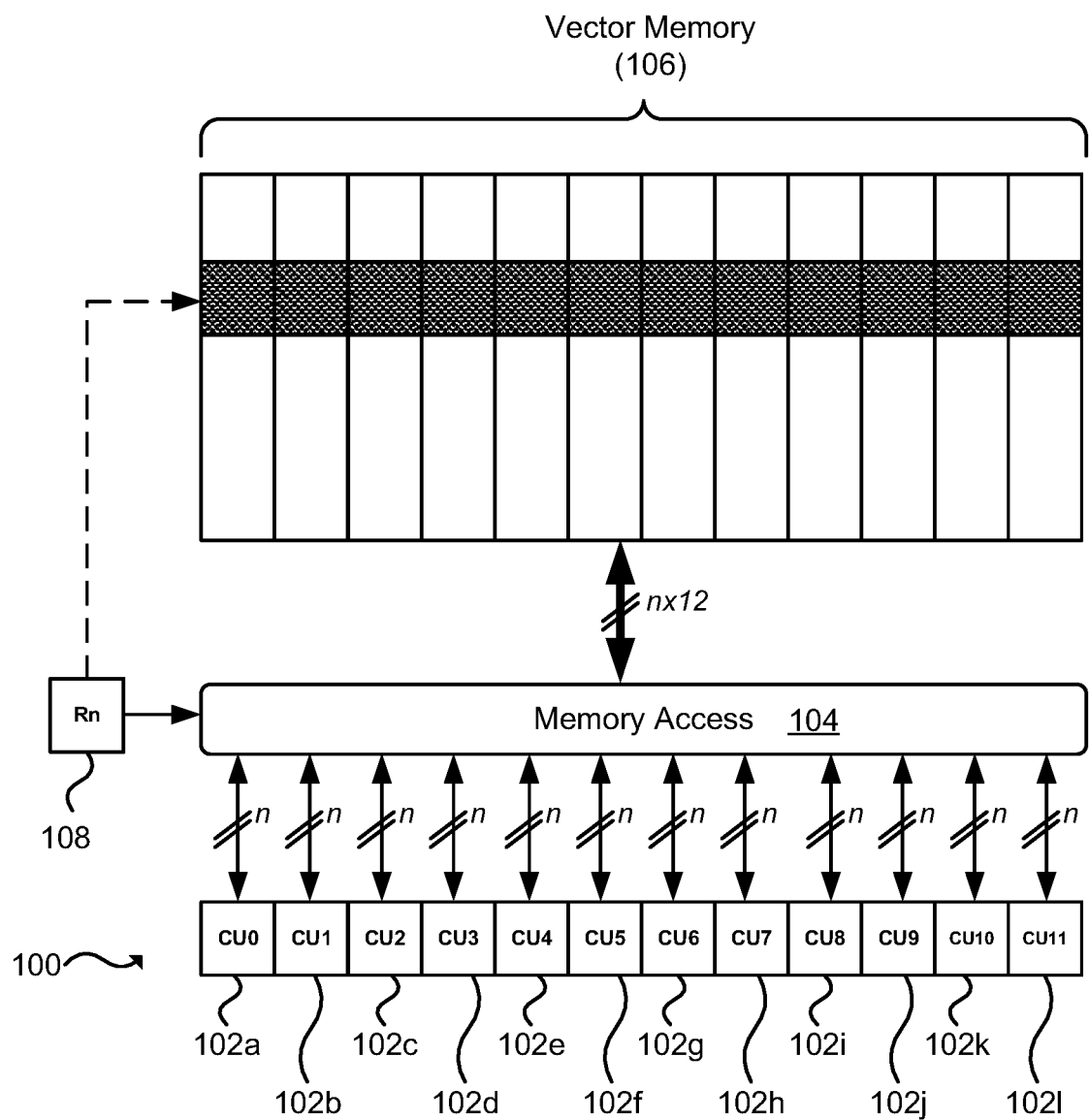
FIG. 1 depicts a prior art SIMD processor and memory.
Figure 2:
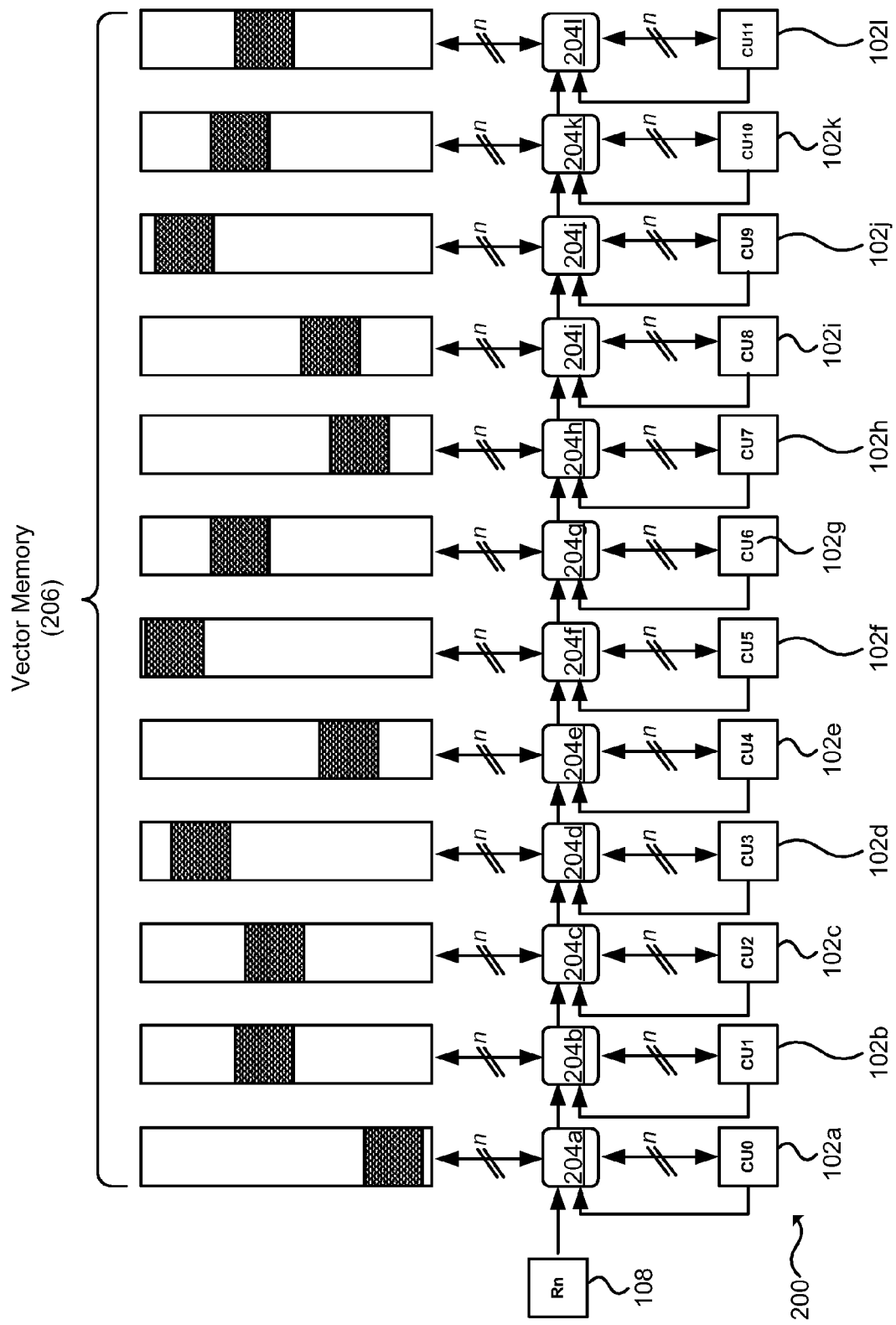
FIG. 2 depicts a further prior art SIMD processor and memory.

A vector processor is described further herein that allows data to be loaded into a plurality of computational units (CUs). As described further herein, the CUs of the vector processor are arranged into a plurality of CU groups. Each CU group has an associated memory access unit for controlling the loading of data into, and out of, the individual CU of the respective CU group. The memory associated with the vector processor is arranged into a plurality of memory macro-blocks, with each memory macro-block associated with a memory access unit of a respective CU group. The CU groups are able to load data from an address of the associated memory macro-block into each of the CUs of the CU group in a single read or write cycle. The memory access units are able to load data into separate CUs of the respective CU group in subsequent read/write cycles. Since the CUs of the processor are arranged into a plurality of CU groups, it is possible to load data from separate addresses within the memory into each individual CU in fewer read/write cycles than required when a single memory access control unit is utilized as described with regards to FIG. 1, while providing a reduced footprint for the memory access in comparison to the plurality of individual memory access control units 204 described with regards to FIG. 2.

Figure 3:
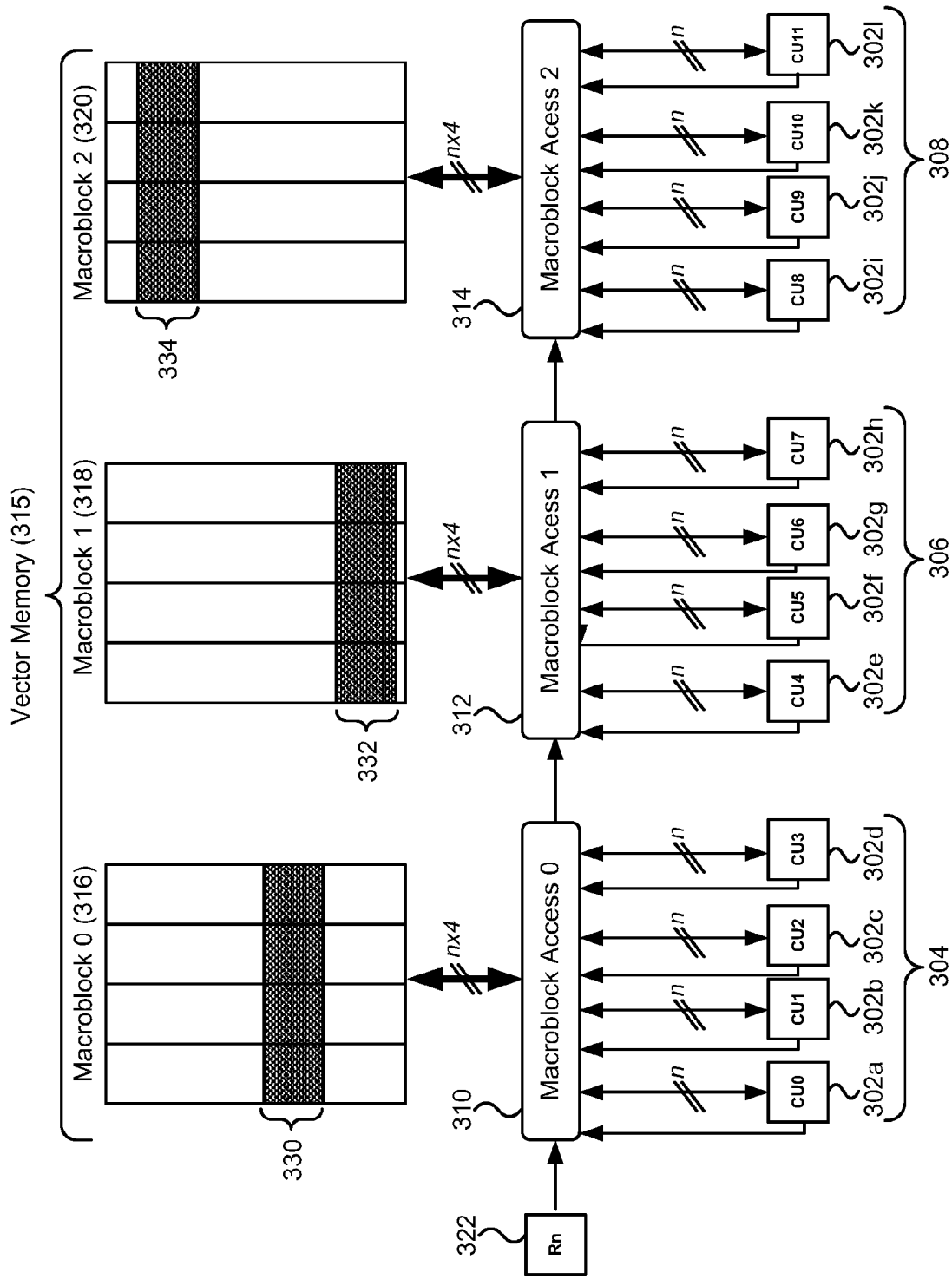
FIG. 3 depicts a SIMD processor and memory.

FIG. 3 depicts a SIMD processor and memory. As depicted, the CUs 302*a-l* of the processor are arranged into a plurality of CU groups 304, 306, 308. Three CU groups are depicted, although more or fewer are contemplated. Each CU group is depicted as comprising 4 CUs, and as such there are a total of 12 CUs in the processor. Each of the 12 CUs is depicted as being an n-bit CU. Each CU group 304, 306, 308 has an associated memory access unit 310, 312, 314 for loading data into and out of CUs of the associated CU group 304, 306, 308. Each of the memory access units 310, 312, 314 is associated with a respective memory macro-block 316, 318, 320 in the vector memory 315.

The vector memory 315 is grouped into a plurality of memory macro-blocks 316, 318, 320. Each memory macro-block 316, 318, 320 is capable of reading or writing a vector of n×4 bits of data to a memory address in a cycle. If, for example, each of the CUs is a 32 bit CU, the memory access units are capable of transferring a vector of 32×4=128 bits of data to or from the associated memory macro-block in a single read/write cycle. A single address (Rn) 322 is depicted in FIG. 3. At the beginning of a memory access cycle the address Rn is provided to the plurality of memory access units 310, 312, 314. The memory access units may then either read or write the data from or to the memory macro-block. As depicted in FIG. 3, if all of the CUs from a CU group are reading or writing for the same memory address the memory macro-blocks can provide all of the data required by the CU group in a single cycle. If the CUs need to read or write to different memory addresses, the memory access units can read from addresses in subsequent cycles. As such, the processor can read or write data for each of the individual CUs from different addresses in 4 cycles, that is, one cycle for each CU in a CU group.

Figure 4:
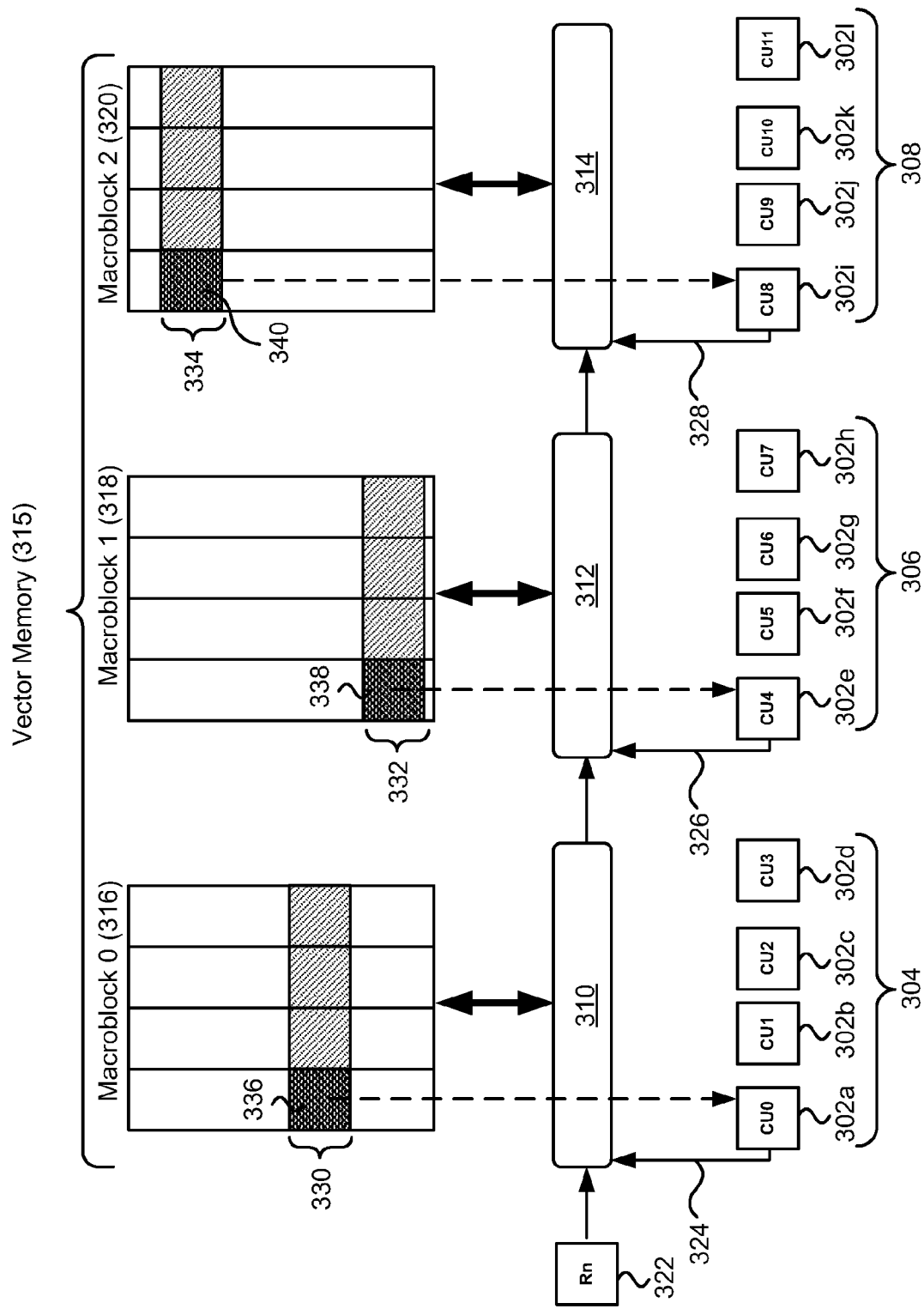
FIGS. 4-7 depict data transfer in the SIMD processor and memory of FIG. 3.

FIGS. 4-7 depict data transfer in the SIMD processor and memory of FIG. 3. As described above, a CU group can load data from or into an address of the memory macro-block into each CU in a single read/write cycle. The following describes loading data from memory into CUs; however it will be appreciated that the same process can be applied for writing data from the CU into the memory. FIG. 4, depicts a first cycle for loading data into the CUs of the CU groups. As depicted, an address (Rn) 322 is provided to the memory access units 310, 312, 314 that provides a base address for loading the data from. Once the base address (Rn) 322 is loaded into the memory access units 310, 312, 314 the first CUs 302*a*, 302*e*, 302*i* of the CU groups 304, 306, 308 may provide an offset address to the base address (depicted by lines 324, 326, 328). If an offset is used, the memory access units 310, 312, 314 add the offset to the base address (Rn) 322 to provide a memory address. It will be appreciated that each memory access units 310, 312, 314 may generate a different memory address. Once the memory addresses are generated, the memory access units 310, 312, 314 read the data from the address location within the associated memory macro-blocks 316, 318, 320. As depicted, a full n×4 bits of data 330, 332, 334 may be transferred between the memory macro-blocks and the associated memory access units 310, 312, 314 even though only n bits of data 336, 338, 340 are required to be transferred to the respective first CUs 302*a*, 302*e*, 302*i*. As depicted, the data is transferred from the memory macro-blocks to the memory access units, which subsequently transfer an n-bit block of data 336, 338, 340 to the respective CUs 302*a*, 302*e*, and 302*i*.

Figure 5:
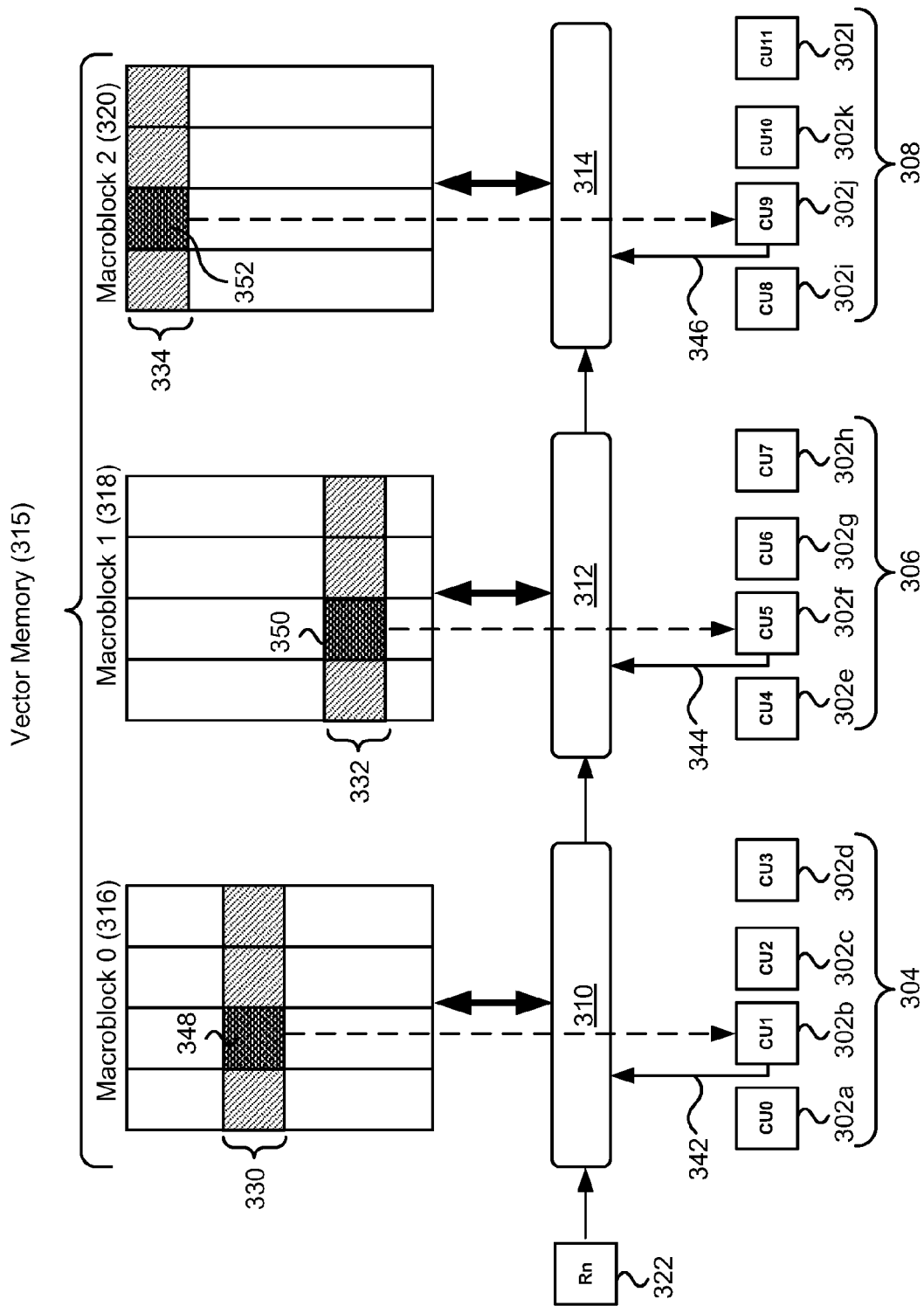

Once the first CUs 302*a*, 302*e*, 302*i* have loaded the data 336, 338, 340 the memory access units 310, 312, 314 can load a further address offset from the second CUs of the CU groups (depicted by lines 342, 344, 346) as shown in FIG. 5. The offset address loaded from the CUs 302*b*, 302*f*, 302*j* may be added to the base address in the respective memory access units 310, 312, 314. Once the memory address is generated, the memory access units read the n-bit data blocks 348, 350, 352 from the respective memory macro-blocks 316, 318, 320 and loads the data into the respective CUs 302*b*, 302*f*, 302*j* of the CU groups 304, 306, 308.

Figure 6:
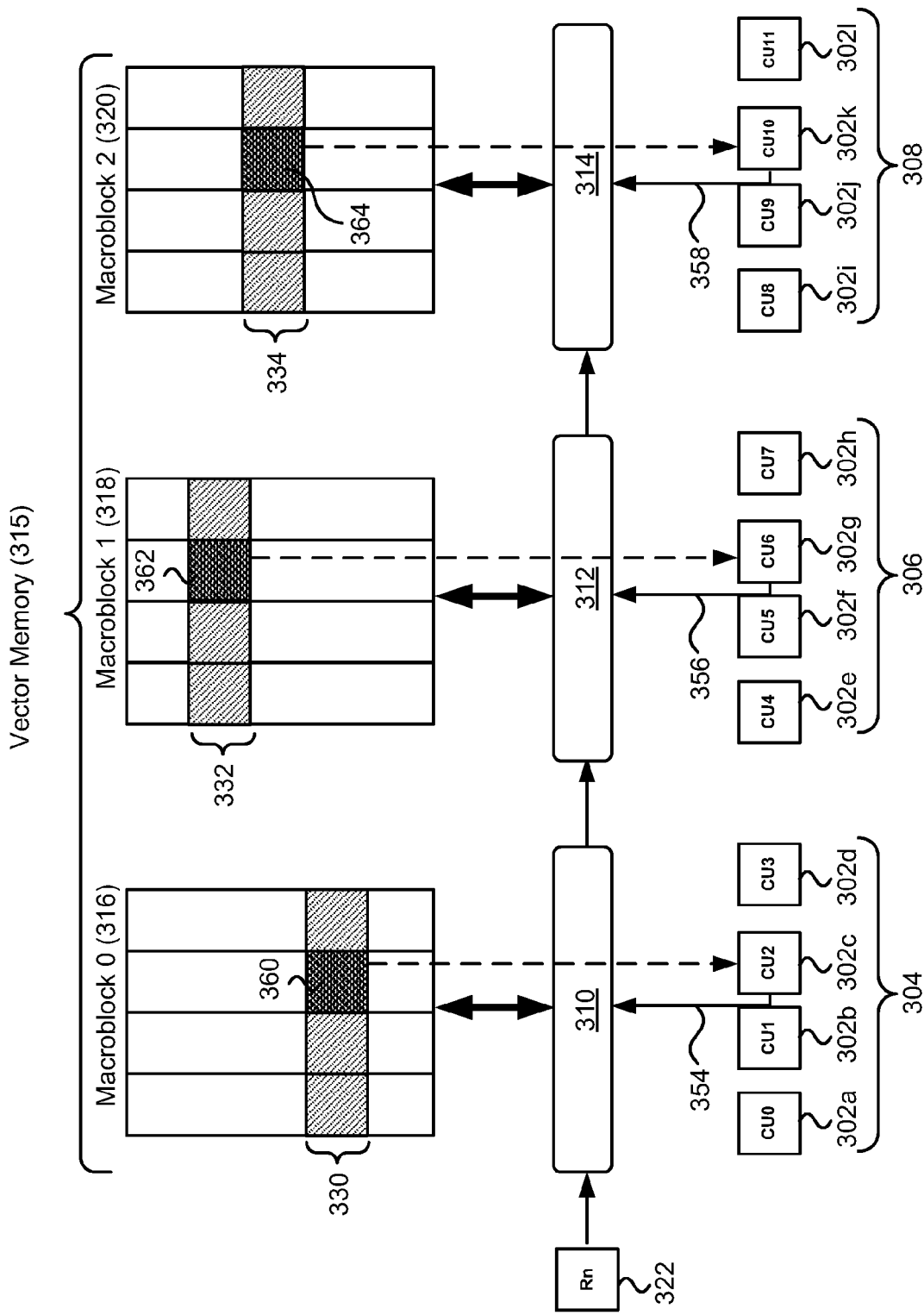

Once the second CUs 302*b*, 302*f*, 302*j* have loaded the data 342, 244, 346 the memory access units 310, 312, 314 can load a further address offset from the third CUs 302*c*, 302*g*, 302*k* of the CU groups (depicted by lines 354, 356, 358) as shown in FIG. 6. The offset address loaded from the CUs 302*c*, 302*g*, 302*k* may be added to the base address (Rn) 322 in the respective memory access units 310, 312, 314. Once the memory address is generated, the memory access units read the n-bit data blocks 360, 362, 364 from the respective memory macro-blocks 316, 318, 320 and loads the data into the respective CUs 302*c*, 302*g*, 302*k* of the CU groups 304, 306, 308.

Figure 7:
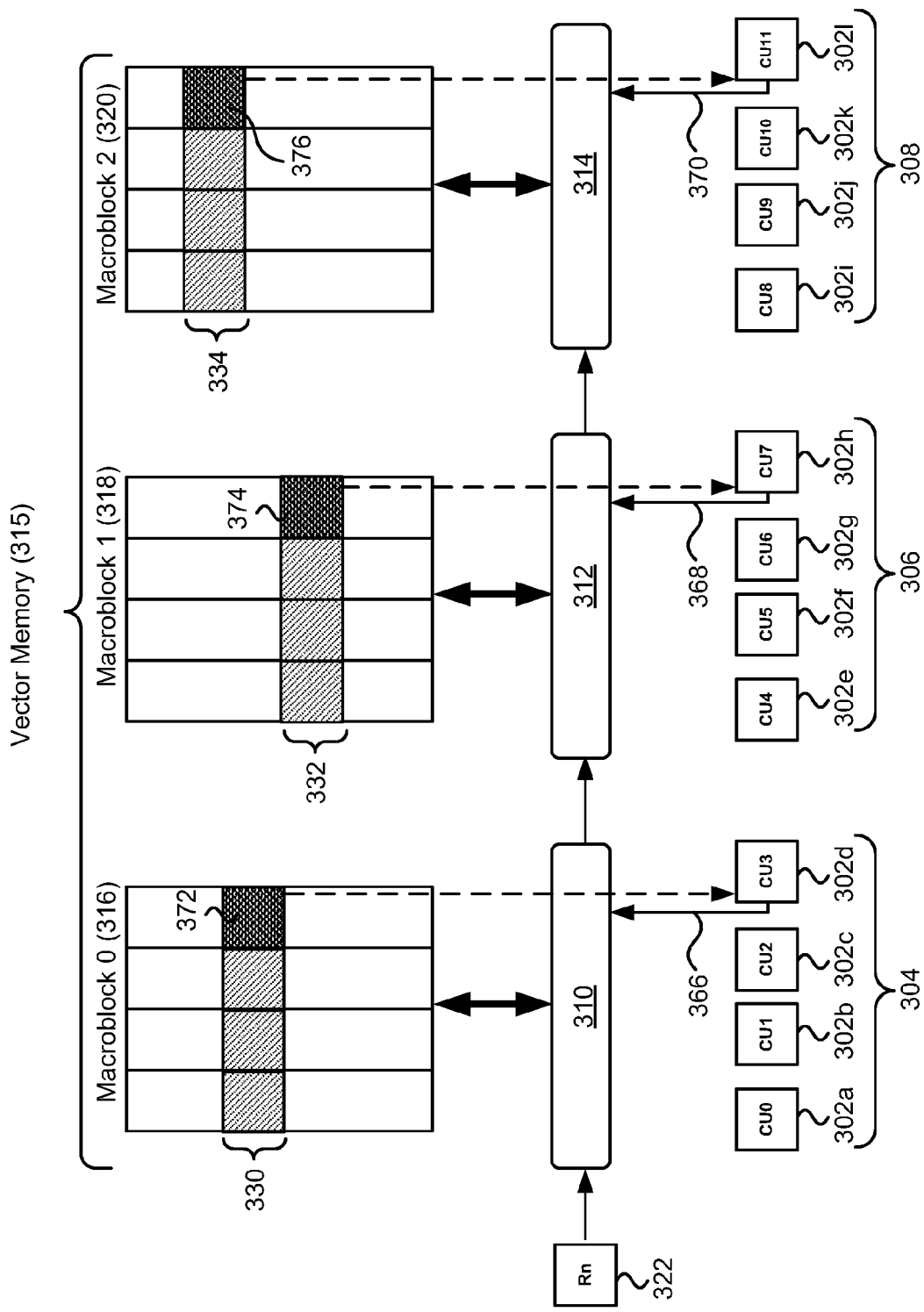

Once the third CUs 302*c*, 302*g*, 302*k* have loaded the data 360, 362, 364 the memory access units 310, 312, 314 can load a further address offset from the fourth CUs 302*d*, 302*h*, 302*l* of the CU groups (depicted by lines 366, 368, 370) as shown in FIG. 7. The offset address loaded from the CUs 302*d*, 302*h*, 302*l* may be added to the base address (Rn) 322 in the respective memory access units 310, 312, 314. Once the memory address is generated, the memory access units read the n-bit data blocks 372, 374, 376 from the respective memory macro-blocks 316, 318, 320 and loads the data into the respective CUs 302*d*, 302*h*, 302*l* of the CU groups 304, 306, 308.

Figure 8:
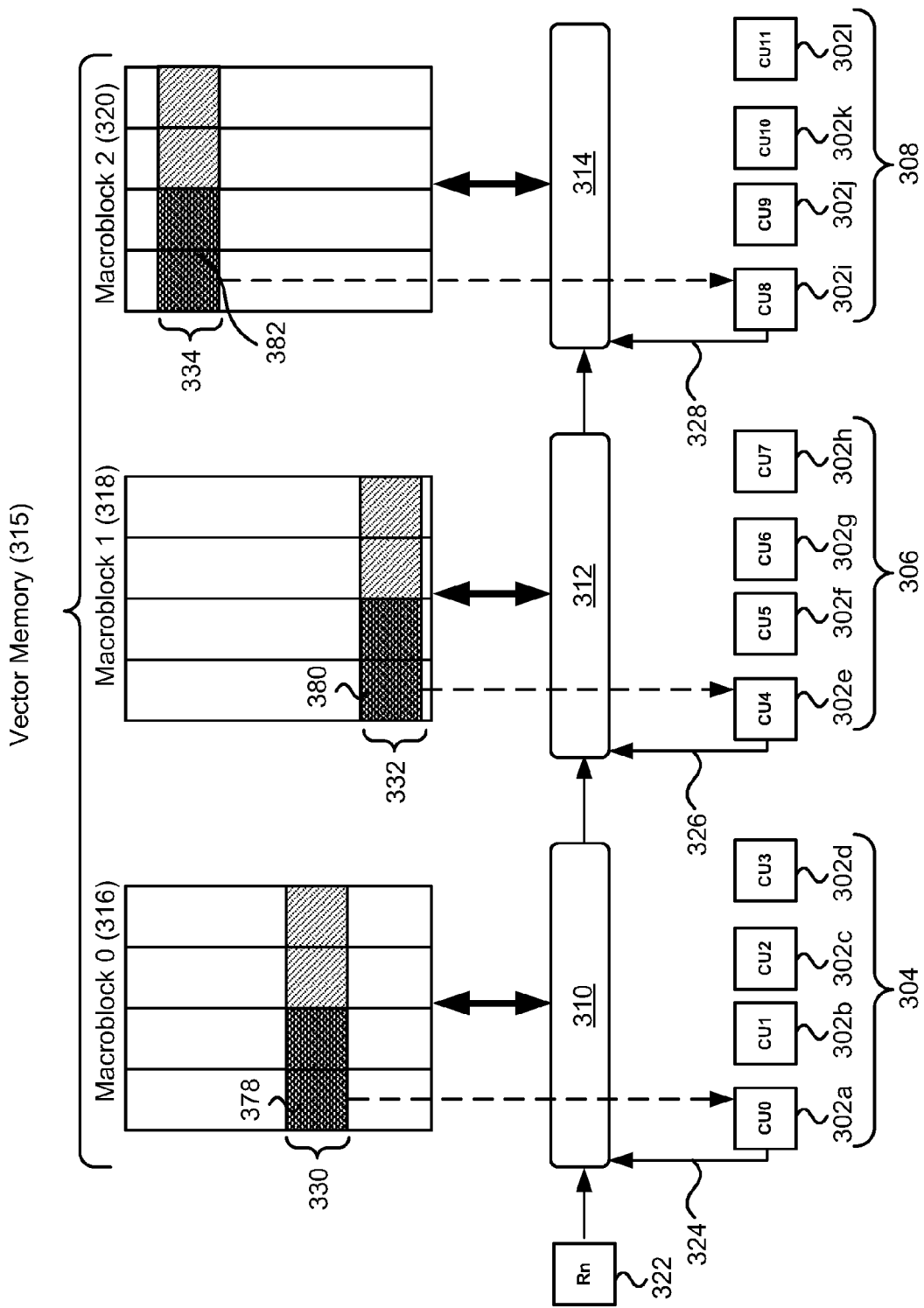
FIG. 8 depicts a further data transfer in the SIMD processor and memory of FIG. 3.

FIG. 8 depicts a further data transfer in the SIMD processor and memory of FIG. 3. The data transfer described above with reference to FIGS. 4-7 depicts loading n bits of data into respective CUs. As described with reference to FIGS. 4-7, it takes four read cycles in order to load data from separate memory locations into each of the individual CUs 302. As will be appreciated, different CUs load data from the same address in the memory macro-block as one or more of the other CUs in the CU group. As such, it is possible to load data into a plurality of CUs of a CU group in the same read cycle. Turning to FIG. 8, each memory access unit 310, 312, 314 receives a base address to load data from in the respective memory macro-blocks 316, 318, 320. One of the CUs in each of the CU groups, depicted as the first CU 302*a*, 302*e*, 302*i*, may provide a respective offset to be added to the base address 322. Once the address for accessing the memory macro-block is generated, the memory access units 310, 312, 314 can retrieve data from the associated memory macro-blocks at the generated address. As depicted, 2×n bits of data 378, 380, 382 are retrieved from the memory macro-blocks, and each of the 2 n bit data blocks are loaded into respective CUs of the CU groups, depicted as the first and second CUs 302*a*, 302*b*, 302*e*, 302*f*, 302*i*, 302*j*. As such, if a plurality of CUs load data from the same address location in the respective memory macro-blocks, the time required to load data into each of the individual CUs may be reduced.

Figure 9:
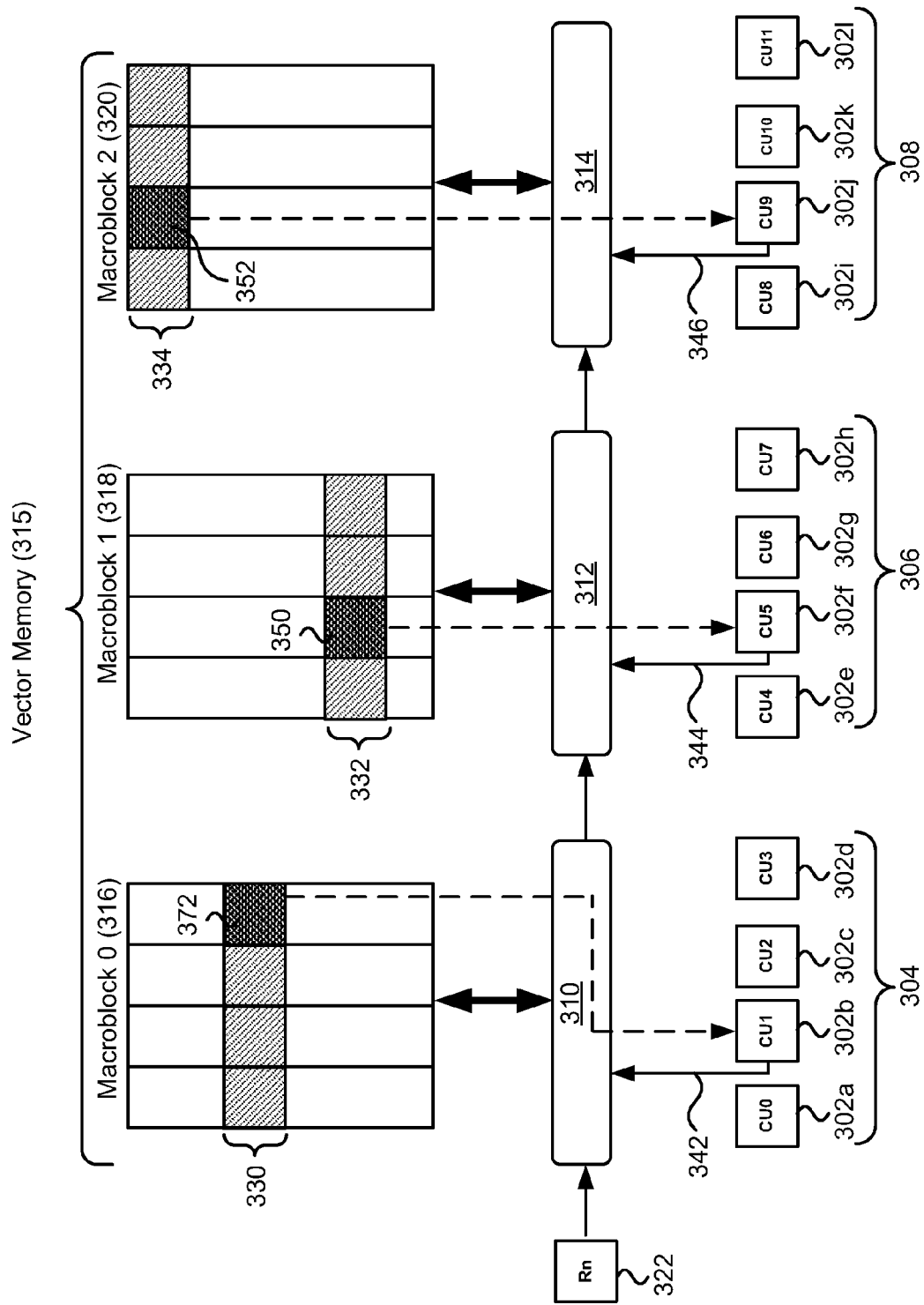
FIG. 9 depicts a further data transfer in the SIMD processor and memory of FIG. 3.

FIG. 9 depicts further data transfer in the SIMD processor and memory of FIG. 3. The data transfer described above with reference to FIGS. 4-7 and 8 have described loading data into respective CUs based on the order of the CU. Each memory macro-block can provide a vector of data that can supply the 4×n bits of data for each CU group. As depicted, the first CUs of the CU groups receives the first n bits of data from the retrieved vector, the second CUs of the CU groups receives the next n bits of data, the third CUs of the CU groups receive the next n bits of data, and the fourth CUs of the CU groups receive the last n bits of data from the retrieved vector. However, it is contemplated that the memory access units of each CU group may load any of the blocks of data from the retrieved vector into one of the CUs.

As depicted in FIG. 9, two of the CU groups 312, 314 are loading data into the second CUs of the CU groups as described above with reference to FIG. 5. That is, each CU 302*f*, 302*j* receives the second set of n bits 350, 352 from the vector retrieved at the generated addresses in the respective memory macro-blocks. However, the first CU group 304 is depicted as loading the last n bits of data of the retrieved vector 330 in the memory macro-block 316.

Figure 10:
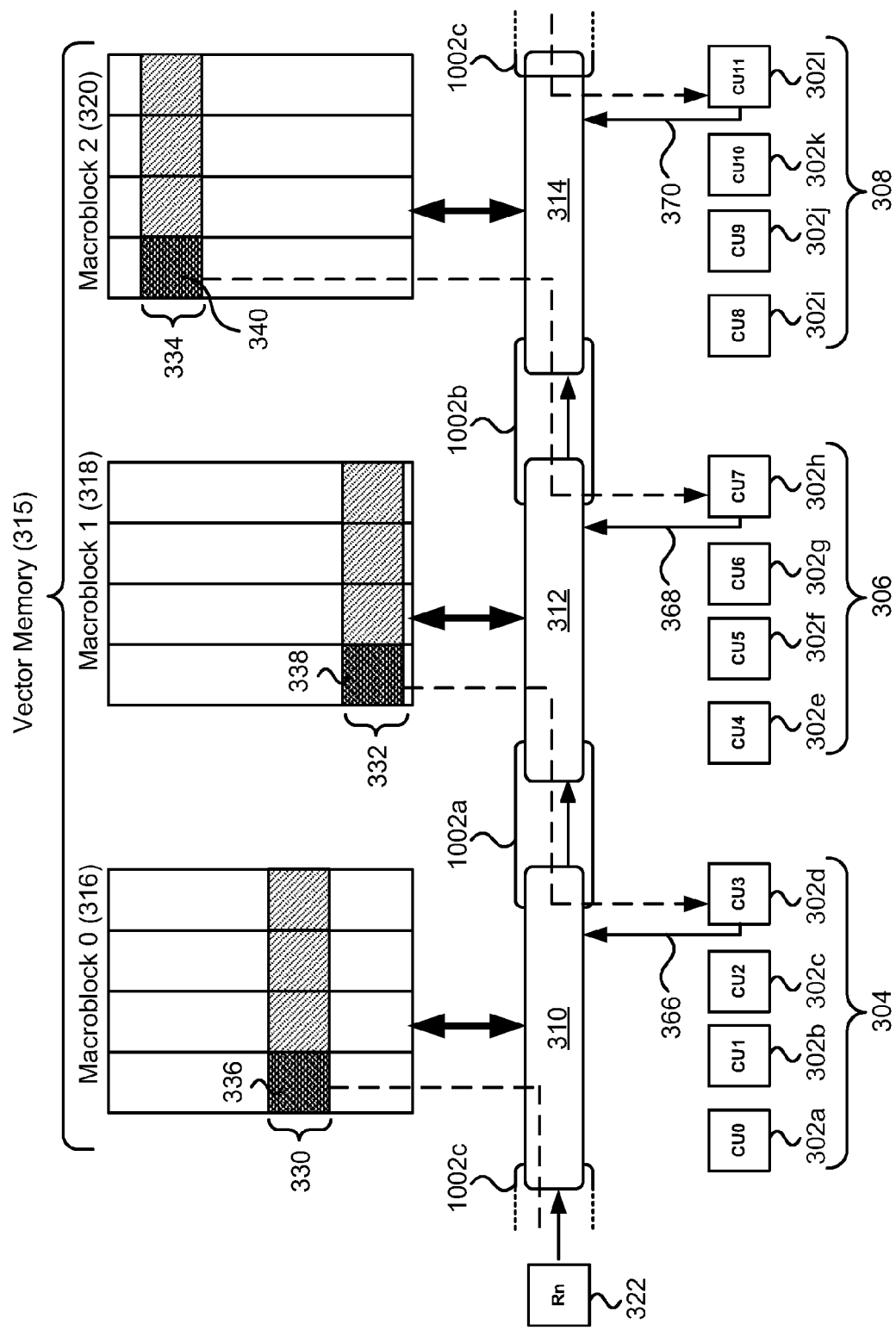
FIGS. 10 and 11 depict data transfer in a further SIMD processor and memory.
Figure 11:
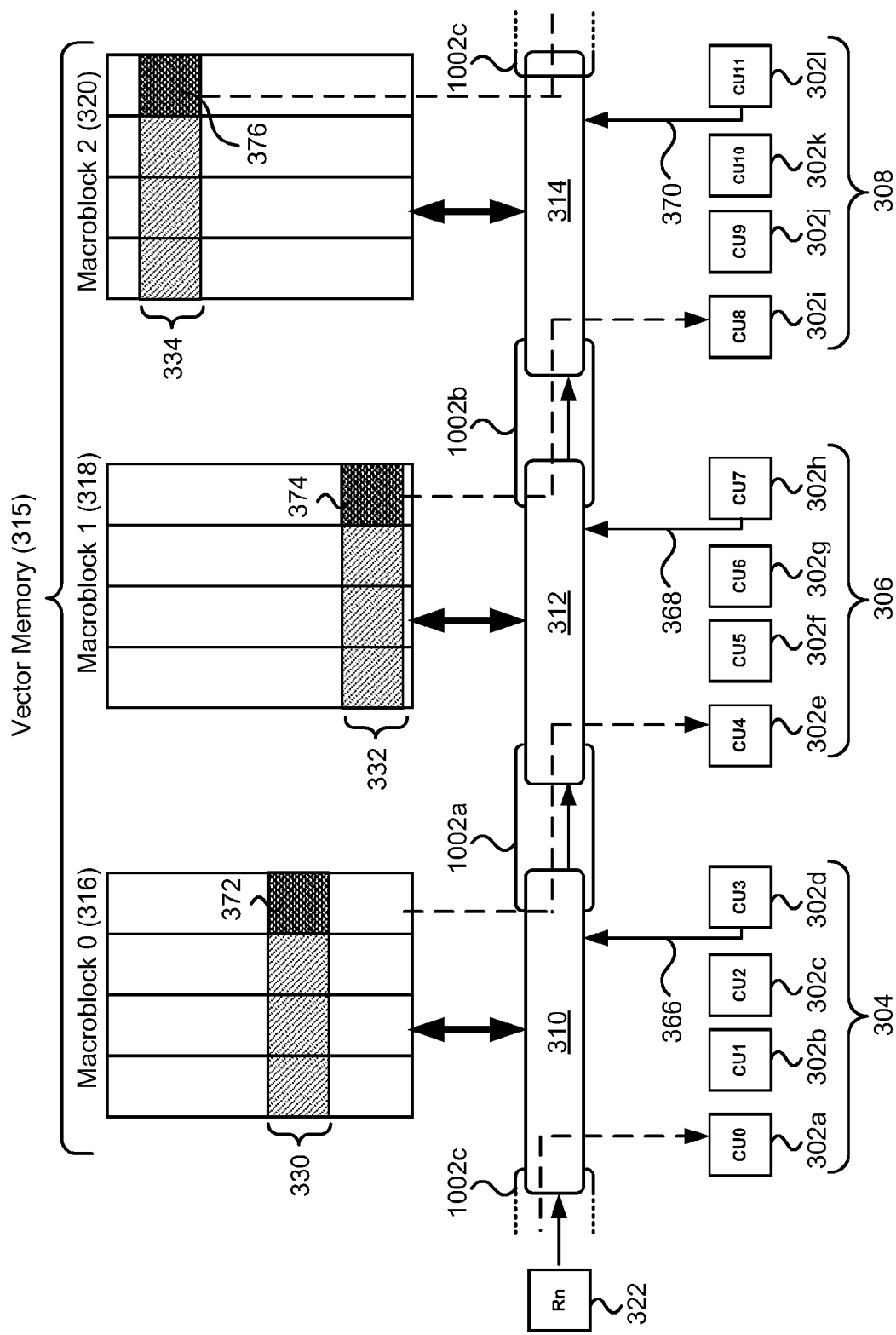

FIGS. 10 and 11 depict data transfer in a further SIMD processor and memory. The memory access units 310, 312, 314 of FIGS. 3 to 9 were depicted as only accessing vector data from one of the memory macro-blocks. The memory access units 310, 312, 314 may comprise an inter-block connection 1002*a*, 1002*b* 1002*c* to adjacent memory access units 310, 312, 314. The inter-block connections 1002*a*, 1002*b*, 1002*c* allow data to be loaded into one of the CUs from an adjacent memory macro-block 316, 318, 320. With regards to the inter-block connection 1002*a*, a CU, depicted as CU 302*d*, of one CU group 304 can load data 338 from an adjacent memory macro-block 318.

When loading data from an adjacent memory macro-block, an additional cycle may need to be added to the processing of a complete read/write operation. That is, the first through fourth cycles of a read/write operation may load data from a first through fourth address respectively in the memory block 316. An additional cycle of the read/write operation may load data to or from the adjacent memory macro-block 318. The address used for loading the data from the adjacent memory macro-block 318 may be provided by one of the CUs, for example CU 302*d*, of the CU group 304, depicted as arrow 366.

The inter-block connections 1002*a*, 1002*b*, 1002*c* are depicted as providing data from memory macro-block to the right of the CU group. As depicted in FIG. 10, an inter-block connection 1002*c* may provide data between the first and last memory macro-blocks 316, 320.

FIG. 10 depicts the inter-block connections as providing data between a memory macro-block located to the right of the CU group. It will be appreciated, that in the Figure, the first memory macro-block 316 may be considered as being to the right of the last CU group 308.

FIG. 11 is similar to FIG. 10; however, instead of loading data to or from a memory macro-block to the right of the CU group, the data is loaded to or from a memory macro-block to the left of the CU group. Again, an additional cycle may be added to the read/write operation. Accordingly, a read/write operation that allows data to be loaded to or from both the left and right neighboring memory macro-blocks 316, 318, 320 may require 6 cycles. As described further with reference to FIGS. 16 and 17, a CU group may be associated with more than two neighboring memory macro-blocks, which may require additional clock cycles. For example and with reference to CU group 306, the first cycle may load data to or from the neighboring memory macro-block 316 to the left of the CU group 306, the next four cycles may load data from the memory macro-block 318 associated with the CU group 306 and the sixth cycle may load data from the neighboring memory macro-block 320 to the right of the CU group 306.

As described above, a read/write operation may comprise more cycles than required for a specific operation. That is, the read/write operation may load six different n-bit blocks of data, even though there are only 4 CUs that require data to be loaded to or from. As such, two cycles may not actually load data to or from a CU. It is contemplated that the memory access units could implement the read/write operations in the minimum number of cycles required for a particular operation; however, the logic required to implement such a realization could impose too high of an overhead in terms of complexity. For example, four cycles could be used to load the required data into each CU of a CU group, however, it may become more complex if, for example, a CU requires data from a neighboring memory macro-block that is not accessed by the associated CU group, and as such the neighboring memory macro-block would be required to provide five reads/or writes. One of the read/writes would provide the data to the neighboring CU group, while the other four would provide the data to the CUs of the associated CU group. As such, it may be beneficial to include the additional cycles in a read/write operation.

Figure 12:
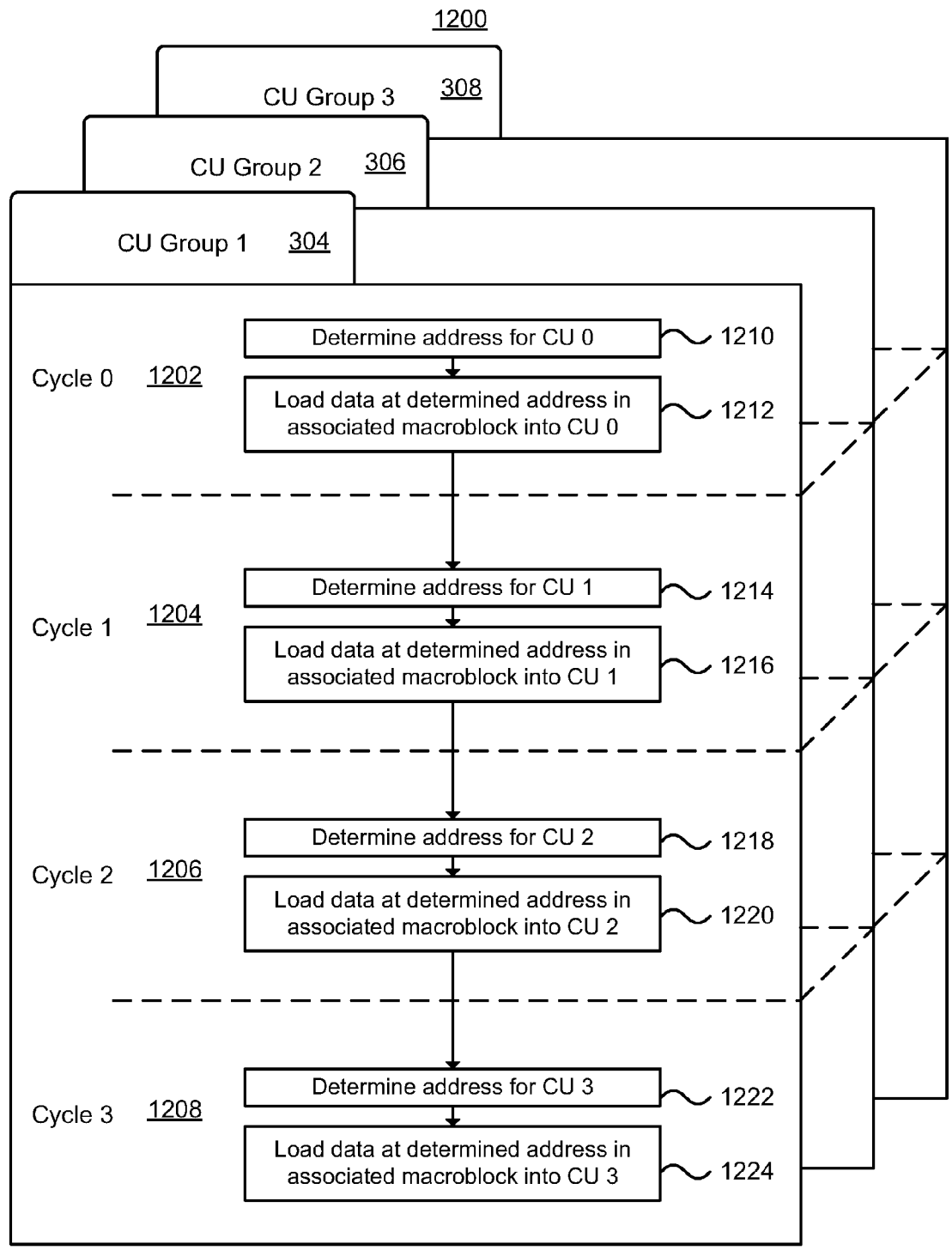
FIG. 12 depicts a process for loading data into individual computational units.

FIG. 12 depicts a process of loading data into CU groups of the vector processor and memory of FIG. 3. As will be appreciated, each CU group performs the same method at the same time. That is, although the method is depicted for the first CU group 304, the other CU groups 306, 308 perform the same methods in parallel with each other.

The data loading processes 1200 described loads data into each individual CU from different memory addresses in the respective memory macro-blocks. The process 1200 may provide for the loading of data as described above with reference to FIGS. 4-7. In FIG. 12, it is assumed that each CU group 304, 306, 308 is comprised of four CUs. It is contemplated that additional or fewer CU groups could be present, and that each individual CU group may comprise additional or few individual CUs.

The data loading process 1200 takes 4 cycles to complete. In the first cycle 1202, the address in the vector memory macro-block is determined for the first CU (1210). The address for the first CU may be determined by adding an offset address from the first CU to a base address. Alternatively, the address may be determined solely from a base address, or solely from the first CU. Once the address is determined, data is loaded from the determined address in the vector memory macro-block associated with the CU group of the CU (1212). As will be appreciated, the memory macro-block is arranged as vector memory, and as such can provide a vector of n×m bits of data for each memory address, where n is the number of bits of the individual CUs and m is the number of individual CUs in a CU group. In the first cycle, data is loaded into the first CU, and as such, only a subset of the data, in particular n bits, retrieved is loaded into the first CU. In one embodiment, the first CU may load the first n bits of data from the retrieved vector. Alternatively, the CU may load the second, third or fourth n bits of data from the retrieved vector. Once each of the first CUs of the respective CU groups have completed the first cycle, that is, once data has been loaded into each of the first CUs, the CU groups begin the second cycle 1204.

The second cycle 1204 begins with determining an address within the vector memory macro-block for the second CU (1214). The address for the second CU may be determined by adding an offset address from the second CU to a base address. Alternatively, the memory address may be determined solely from the base address or solely from the address provided by the CU. Once the address is determined, the data is loaded into the second CU from the vector memory macro-block (1216). As described above, the data loaded into the CU may be only a subset of the vector retrieved from the memory macro-block. Once each of the second CUs of the respective CU groups have completed the second cycle, that is, once data has been loaded into each of the second CUs, the CU groups begin the third cycle 1206.

The third cycle 1206 begins with determining an address within the vector memory macro-block for the third CU (1218). The address for the third CU may be determined by adding an offset address from the third CU to a base address. Alternatively, the memory address may be determined solely from the base address or solely from the address provided by the CU. Once the address is determined, the data is loaded into the third CU from the vector memory macro-block (1218). As described above, the data loaded into the CU may be only a subset of the vector retrieved from the memory macro-block. Once each of the third CUs of the respective CU groups have completed the third cycle, that is, once data has been loaded into each of the third CUs, the CU groups begin the fourth cycle 1208.

The fourth cycle 1208 begins with determining an address within the vector memory macro-block for the fourth CU (1222). The address for the fourth CU may be determined by adding an offset address from the fourth CU to a base address. Alternatively, the memory address may be determined solely from the base address or solely from the address provided by the CU. Once the address is determined, the data is loaded into the fourth CU from the vector memory macro-block (1224). As described above, the data loaded into the CU may be only a subset of the vector retrieved from the memory macro-block. Once each of the fourth CUs of the respective CU groups have completed the fourth cycle, that is, once data has been loaded into each of the fourth CUs, all of the CUs in each of the CU groups have newly loaded data and may process the loaded data according to an instruction to be performed.

Figure 13:
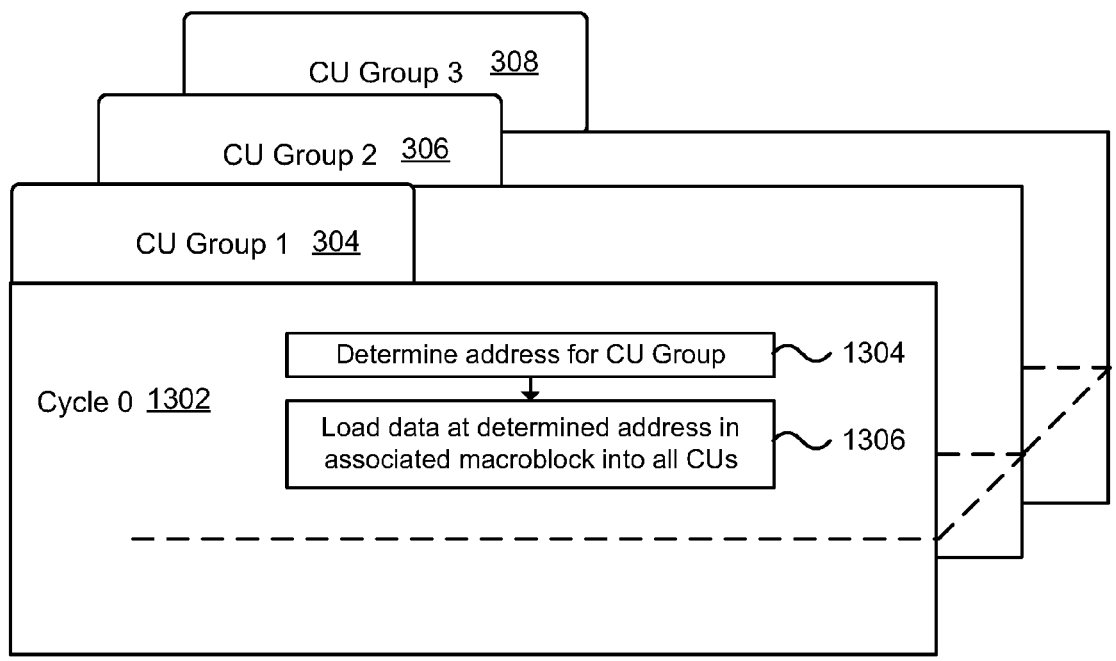
FIG. 13 depicts a further process for loading data into individual computational units.

FIG. 13 depicts a further process of loading data into CU groups of the vector processor and memory of FIG. 3. As will be appreciated, each CU group performs the same method at the same time. That is, although the method is depicted for the first CU group 304, the other CU groups 306, 308 perform the same methods in parallel with each other.

The data loading processes 1300 described loads data into each individual CU from the same memory address in the respective memory macro-blocks. The process 1300 may provide for the loading of data as described above with reference to FIG. 3. In FIG. 13, it is assumed that each CU group 304, 306, 308 is comprised of four CUs. It is contemplated that additional or fewer CU groups could be present, and that each individual CU group may comprise additional or few individual CUs.

The data loading process 1300 takes one cycle to complete. In the first cycle 1302, the address in the vector memory macro-block is determined from which data will be loaded into each of the individual CUs (1304). The address may be determined from a base address. Alternatively, the address may be determined by one of the individual CUs of by adding an offset address from the CU to a base address, or providing the address. Once the address is determined, data is loaded into each of the individual CUs from the determined address in the vector memory macro-block associated with the CU group (1306). As will be appreciated, the memory macro-block is arranged as vector memory, and as such can provide a vector of n×m bits of data for each memory address, where n is the number of bits of the individual CUs and m is the number of individual CUs in a CU group. Each CU may load a respective n bits of data, such as the first, second, third or fourth n bits of data, from the n×m bit vector retrieved from the address. Once all of the CUs have loaded data from the vector memory macro-block, the load operation may be complete.

It should be appreciated, that although described with reference to loading data from memory into a CU, the process may be similarly applicable for writing data from the individual CUs into the vector memory macro-blocks. When storing data to the vector memory macro-block, either a subset of data, such as the first, second, third or fourth n bits of the vector, may be written to the address in the vector memory macro-block. Alternatively, an n×m bit vector may generated by sequentially appending data to be written from the individual CUs into the full vector and subsequently written to the memory address.

The above description has described data as being loaded in a number of cycles. It should be appreciated that the 'cycles' are meant to illustrate the represent all of the steps for loading data to or from a CU. The 'cycles' may comprise a plurality of clock cycles in order to complete the loading process. For example, one loading cycle may comprise generating the required memory address by adding an offset address to a base address, then reading or writing the data from or to the memory address.

Figure 14:
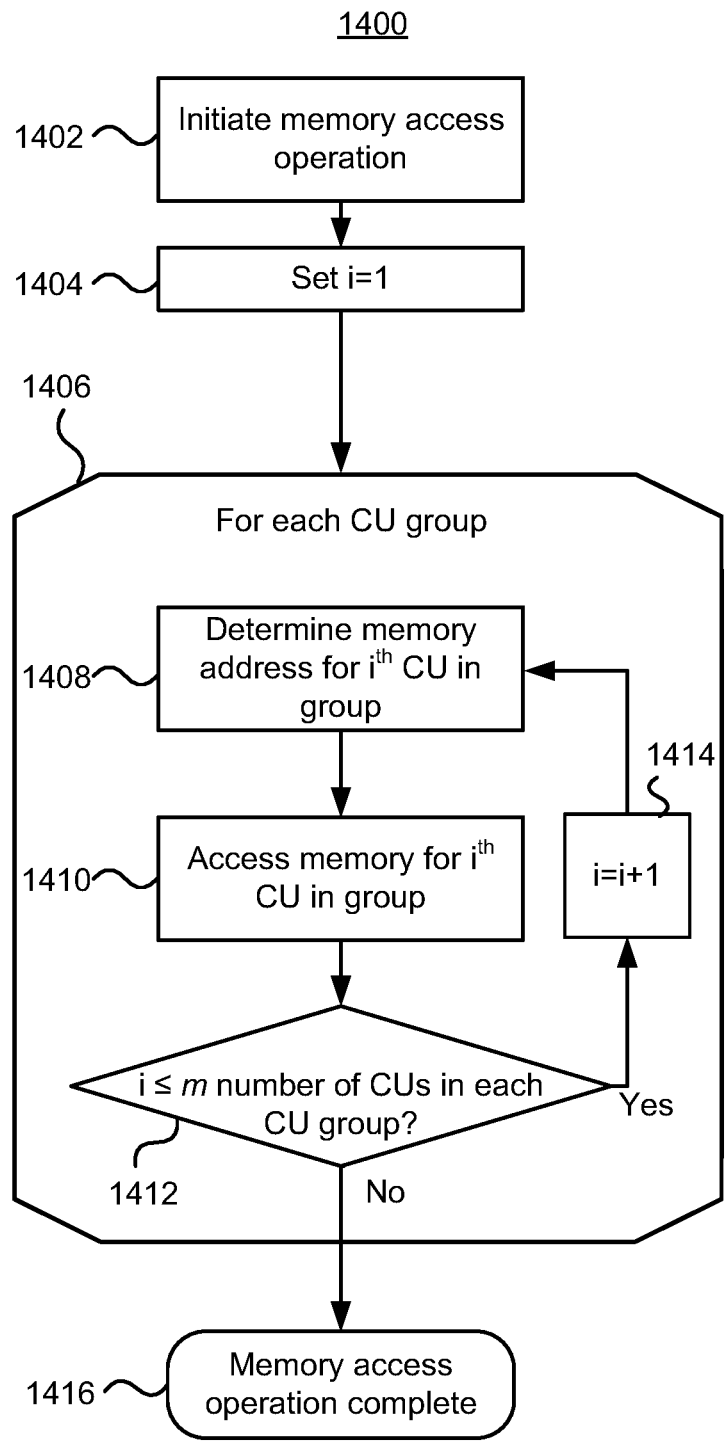
FIG. 14 depicts a method of loading data into individual computational units.

FIG. 14 depicts a method of a memory access operation in accordance with the vector processor and memory described above. The method 1400 begins when a memory access operation is initiated (1402). The memory access operation may either load data from memory into individual CUs, or write data from the CUs into the memory. Once the memory access is initiated, a counter (i) is initiated (1404) for tracking the individual CUs in each of the CU groups. With the counter initialized, the method performs the same actions for each of the CU groups (1406). For each CU group, the method determines a memory address for the $i^{th}$ CU in the respective CU groups (1408) and then accesses the memory location for the $i^{th}$ CU in the CU group (1410). As described, the memory access may comprise reading data from the memory or writing data to the memory. Once the memory location is accessed for the $i^{th}$ CU, the method determines if the counter i is less than or equal to the number of CUs in the CU groups (1412). If the counter i is less than or equal to the number of CUs (Yes at 1412), that is, if there are additional CUs in the CU group, the counter, i, is increased (1414) and processing returns to determine a memory address (1408) for the next CU in each CU group. If the counter i is greater than the number of CUs in the CU groups (No at 1412), that is, if there are no further CUs in the CU groups, than the memory access operation is complete (1416).

Figure 15:
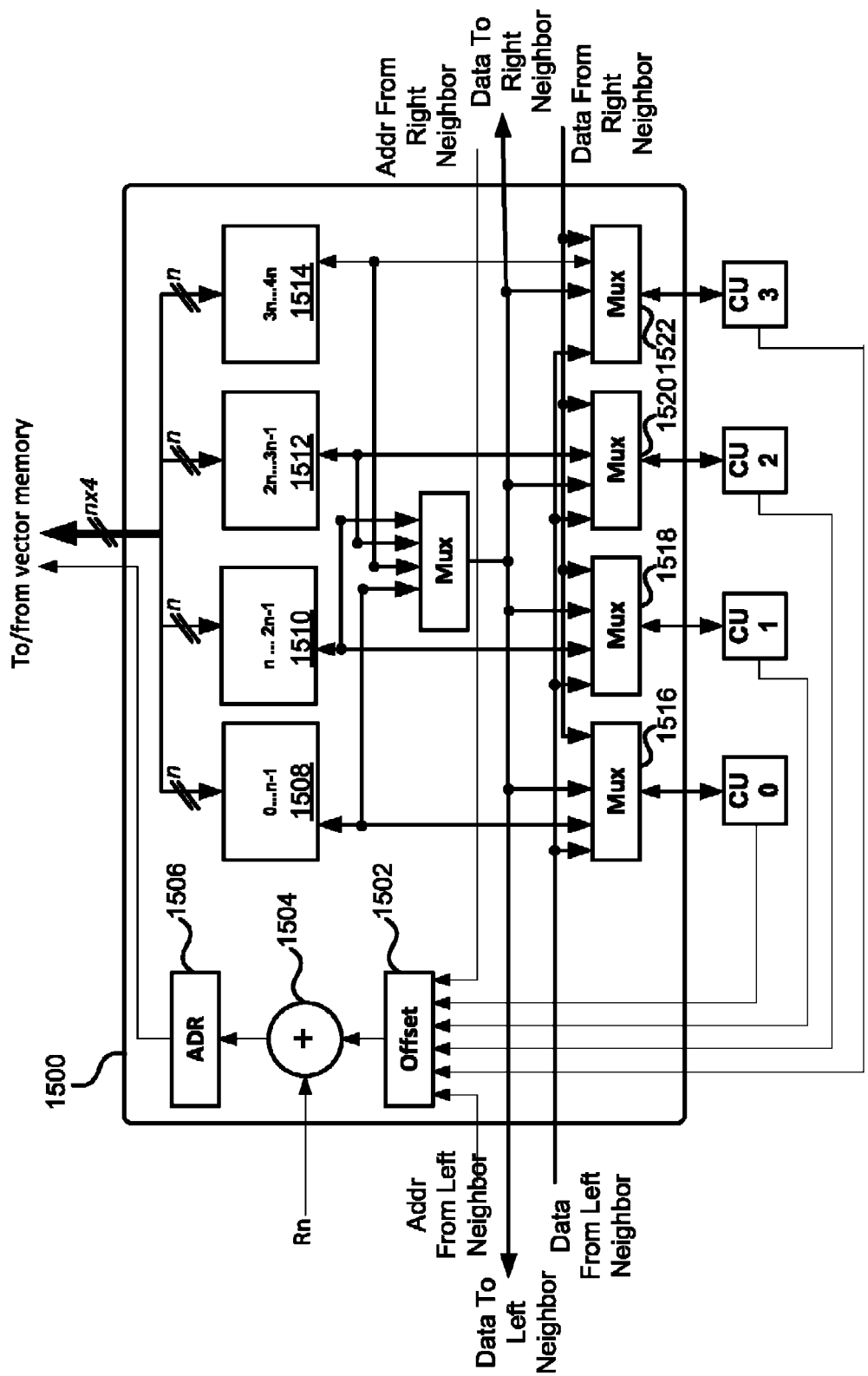
FIG. 15 depicts in a block diagram, illustrative components of a memory access unit.

FIG. 15 depicts in a block diagram, illustrative components of a memory access unit. It will be appreciated that the memory access unit 1500 provides an illustrative memory access unit, and other implementations are possible. The memory access unit 1500 comprises components for generating the appropriate address for accessing in the associated vector memory macro-block. The addressing components may include an address selector multiplexor 1502. The address selector multiplexor may select one of a plurality of addresses, or offsets that are provided from the CUs of the CU group associated with the memory access unit 1500. Additional addresses may be provided to the address selector multiplexor 1502 from the neighboring, both left and right, memory access units. The output of the address selector multiplexor 1502 may be controlled by various control signals to indicate which of the addresses or offset should be produced at the output of the multiplier 1502. The output of the address selector multiplexor may be provided to an addition component 1504, which may add the output from the multiplexor 1502 to a base address and store the result in an address register 1506.

The memory access unit 1500 may further comprise a plurality of registers or memory components 1508, 1510, 1512, 1514, each one of which stores r bits of data. In FIG. 15, r is equal to n, where n is the width of the individual CUs; however, r can be independent of n. As depicted in FIG. 15, n is 32 bits, however, it is contemplated that other widths are possible. Each of the registers 1508, 1510, 1512, 1514 receives data, or alternatively provides data to, a respective portion of the vector memory.

The memory access unit 1500 may have a plurality of output multiplexors 1516, 1518, 1520, 1522 for selecting the data that is provided to the respective CUs of the associated CU group. As depicted, there may be an output multiplexor for each CU in the CU group. Each of the output multiplexors may have the same inputs, namely the n-bits provided by the registers 1508, 1510, 1512, and 1514. If the memory access unit 1500 allows the CUs to load data from the neighboring memory macroblocks, each of the output multiplexors may have additional inputs for receiving n-bits of data from either the left and right neighboring memory access units, or memory macroblocks. Each of the output multiplexors 1516, 1518, 1520, 1522 may have its output controlled by a CU mask indicating which portion of the m×n bits of data from the associated memory macro-block, or neighboring memory macro-blocks, the respective CU is to receive.

Figure 16:
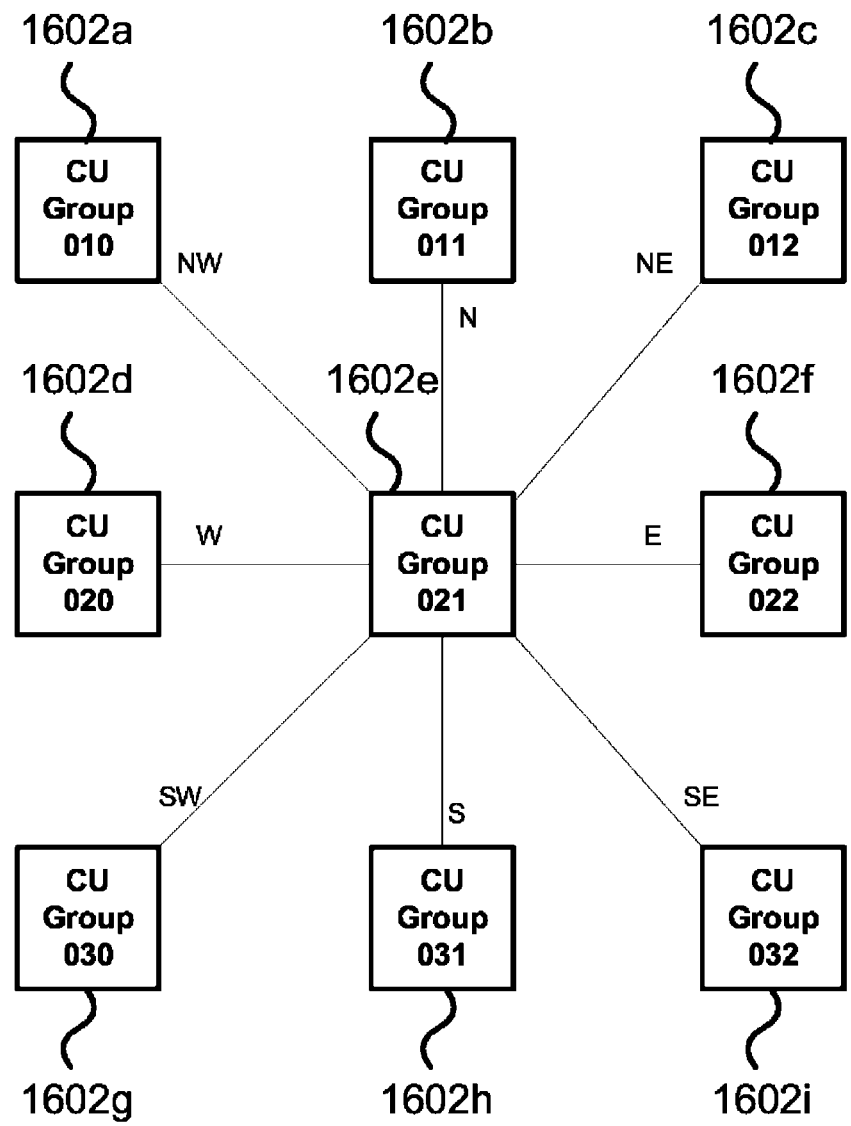
FIGS. 16 and 17 depict possible neighbouring memory macro-blocks of a CU Group.
Figure 17:
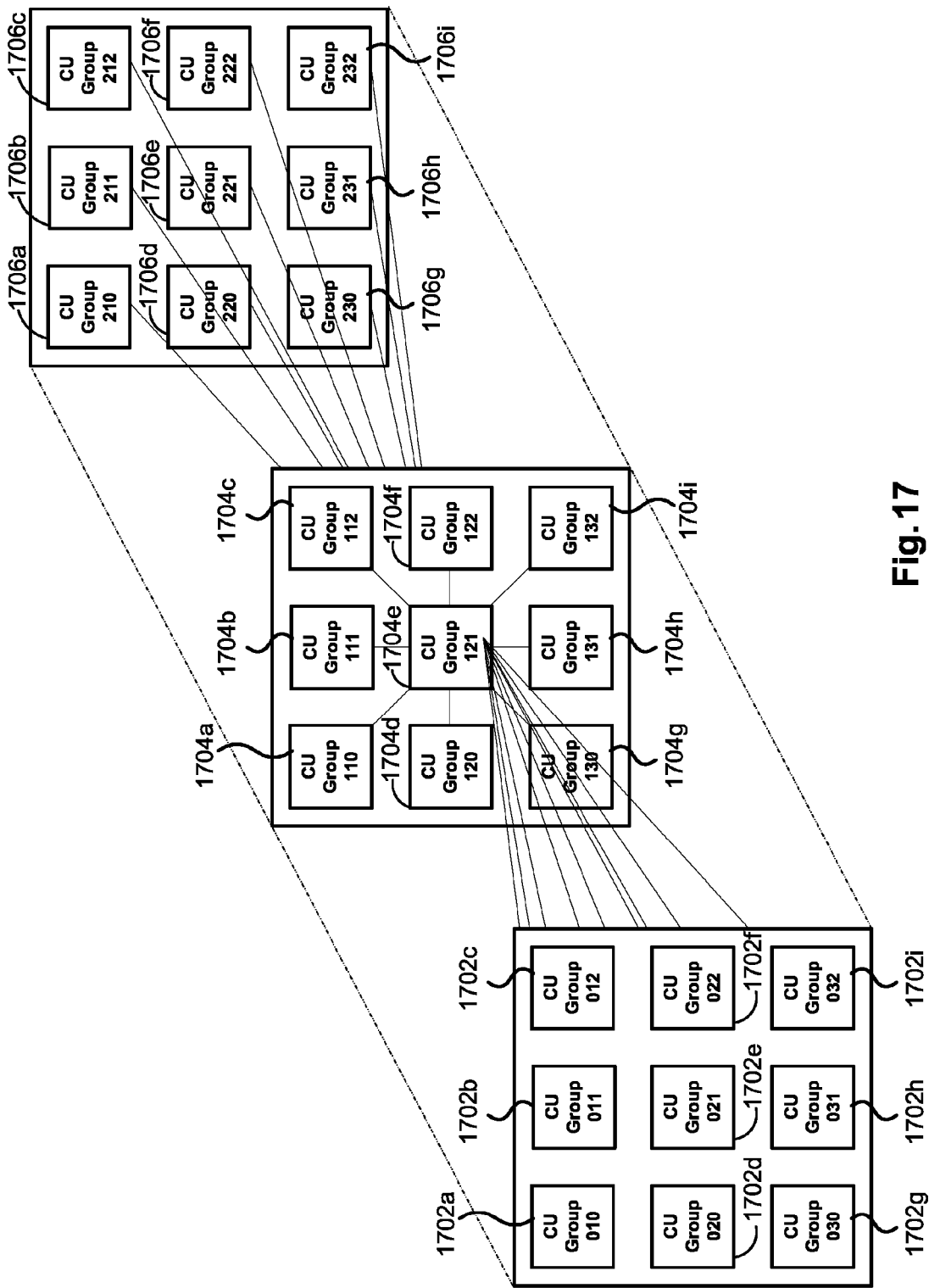

The above has described loading data from a neighboring memory macro block. The neighboring memory macro-blocks have been described as being located to the left and right of a CU group. It is contemplated that each CU group can be associated with one or more neighbors. Each CU group has an associated memory macro-block. A neighboring memory macro-block is any of the remaining memory macro-blocks that the CU group can load data from, and does not need to be physically adjacent to the CU. FIGS. 16 and 17 depict possible neighboring memory macro-blocks of a CU Group. It is noted that the actual memory macro-blocks are not depicted in the figures for clarity. However, each CU Group would be associated with a respective memory macro-block. As depicted in FIG. 16, the CU Groups 1602a, 1602b, 1602c, 1602d, 1602e, 1602f, 1602g, 1602h, 1602i may be logically arranged in a 2-dimensional pattern for example providing north, south, east, west, northeast, northwest, southeast, and southwest connections. The connections between CU Groups is intended to depict the possible neighboring nodes that the CU Group could load data from. As depicted, CU Group 1602e could load data from each of the remaining CU Groups 1602a, 1602b, 1602c, 1602d, 1602f, 1602g, 1602h, 1602i.

FIG. 17 depicts a similar arrangement as depicted in FIG. 16, however the CU groups 1702a, 1702b, 1702c, 1702d, 1702e, 1702f, 1702g, 1702h, 1702i, 1704a, 1704b, 1704c, 1704d, 1704e, 1704f, 1704g, 1704h, 1704i, 1706a, 1706b, 1706c, 1706d, 1706e, 1706f, 1706g, 1706h, 1706i are logically arranged into a 3-dimensional pattern. As depicted, CU Group 1704e could load data from each of the remaining CU Groups 1702a, 1702b, 1702c, 1702d, 1702e, 1702f, 1702g, 1702h, 1702i, 1704a, 1704b, 1704c, 1704d, 1704f, 1704g, 1704h, 1704i, 1706a, 1706b, 1706c, 1706d, 1706e, 1706f, 1706g, 1706h, 1706i.

A vector processor and memory has been described that provides a lower footprint of the memory access components while still providing adequate performance and flexibility. The vector processor and memory may be used in numerous applications, including searching and tabulating data, image processing, audio processing, or video processing. The flexibility provided by grouping the CUs in CU groups provides sufficient performance for many different applications, allowing the same design to be adapted to different specific implementations.

It will be appreciated that not all possible embodiments have been described in detail. However, having regard to the current description, it will be appreciated how to modify the embodiments described in detail herein to provide the features and functionality of other possible embodiments. The devices, systems and methods described herein have been described with reference to various examples. It will be appreciated that systems, devices, components, methods and/or steps from the various examples may be combined together, removed or modified. As described the system may be implemented in one or more hardware components including a processing unit and a memory unit that are configured to provide the functionality as described herein. Furthermore, a computer readable memory, such as for example electronic memory devices, magnetic memory devices and/or optical memory devices, may store computer readable instructions for configuring one or more hardware components to provide the functionality described herein.

In some embodiments, any suitable computer readable memory can be used for storing instructions for performing the processes described herein. For example, in some embodiments, computer readable media can be transitory or non-transitory. For example, non-transitory computer readable media can include non-volatile computer storage memory or media such as magnetic media (such as hard disks), optical media (such as compact discs, digital video discs, Blu-ray discs, etc.), semiconductor media (such as flash memory, read only memory (ROM), Flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, and any suitable media that is fleeting and devoid of any semblance of permanence during transmission, and/or any suitable intangible media.

Although the description discloses example methods and apparatus including, among other components, software executed on hardware, it should be noted that such methods and apparatus are merely illustrative and should not be considered as limiting. For example, it is contemplated that any or all of these hardware and software components could be embodied exclusively in hardware, exclusively in software, exclusively in firmware, or in any combination of hardware, software, and/or firmware. Accordingly, while the following describes example methods and apparatus, persons having ordinary skill in the art will readily appreciate that the examples provided are not the only way to implement such methods and apparatus.

What is claimed is:

1. A device comprising:
a vector memory space divided into a plurality of memory macro-blocks for storing data;
a vector processor comprising a plurality of computational units (CUs) for executing instructions, the plurality of CUs arranged into a plurality of CU groups, each CU group comprising two or more CUs of the plurality of CUs, the plurality of CUs providing execution of a single instruction on multiple pieces of data (SIMD); and
a plurality of memory macro-block access units, each of the plurality of memory macro-block access units:
couples a respective CU group to a respective associated memory macro-block,
is directly connected to each CU of the respective CU group,
controls access of the CUs of the respective CU group to the associated memory macro-block,
controls memory access based on an associated CU address input to the associated memory macro-block to retrieve data from, or place data to, per read/write cycle, and
operates in a first mode when the associated address for each of the CUs in the respective CU group is a same address, and in a second mode when the associated addresses for at least two of the CUs in the respective CU group are different.

2. The device of claim 1, wherein each of the memory macroblock access units determines the address individually for each CU in the associated CU group in subsequent cycles.

3. The device of claim 1, wherein each of the memory macroblock access units determines the address for two or more CUs in the associated CU group in a single cycle.

4. The device of claim 1, wherein there are z CU groups, each with m CUs, each of the CUs has an n-bit interface to the associated memory macro-block, wherein each of the memory macro-blocks can provide n×m bits of data to the associated CU group in a memory access operation, wherein the n×m bits of data for a respective CU group are addressed by a single memory macro-block address.

5. The device of claim 4, wherein each of the memory macro-block access units controls data provided to, or received from, each of the CUs in the respective CU group based on a CU mask indicating a portion of the n×m bits of data from the associated memory macro-block the respective CU is to receive.

6. The device of claim 1, wherein each of the memory macro-block access units can access data from neighboring memory macro-blocks during a portion of a memory access operation.

7. The device of claim 6, wherein each of the memory macro-block access units determines the address from the respective neighboring memory macro-block for two or more CUs in the associated CU group in a single cycle.

8. The device of claim 1, wherein each of the memory macro-block access units can access data from a plurality of neighboring memory macro-blocks during a portion of a memory access operation.

9. The device of claim 8, wherein each memory macro-block access unit has a plurality of neighbors.

10. The device of claim 1 wherein the CU address consists of a base address plus a locally derived offset value.

11. The device of claim 1 wherein if two or more CU's have the same address then they can access the memory concurrently.

12. A method comprising:
initiating a read operation for loading data from memory into a plurality of computational units (CUs) arranged into a plurality of CU groups, the memory arranged into a plurality of memory macro-blocks each associated with a respective CU group of the plurality of CU groups;
for each CU group, determining a respective first memory address; and
for each CU group, accessing the data in the associated memory macro-block at the respective first memory address comprising reading data from the respective memory macro-block or providing data to the respective memory macro-block, wherein
accessing to each of the memory macro-blocks is controlled by a respective memory access unit which controls memory access based on an associated CU address input to the associated memory macro-block to retrieve data from, or place data to, per read/write cycle,
each respective memory access unit is directly connected to each CU in a respective CU group,
there are z CU groups, each with m CUs, each of the CUs has an n-bit interface to the associated memory macro-block,
each of the memory macro-blocks can provide n×m bits of data to the associated CU group in a memory access operation, and
the n×m bits of data for a respective CU group are addressed by a single memory macro-block address.

13. The method of claim 12, further comprising:
reading data from the respective memory macro-block to a first CU of the respective CU group or providing data to the respective memory macro-block from the first CU of the respective CU group, wherein the first memory address is associated with the first CU;
for each CU group, determining a respective second memory address associated with a respective second CU in the CU group; and
reading data from the respective memory macro-block to the second CU of the respective CU group or providing data to the respective memory macro-block from the second CU of the respective CU group.

14. The method of claim 13, wherein the first and second memory addresses are individually determined for each of the first and second CUs in the associated CU group in subsequent cycles.

15. The method of claim 12, wherein the first memory address is determined for two or more CUs in the associated CU group in a single cycle.

16. The method of claim 12, further comprising controlling data provided to, or received from, each of the CUs in the respective CU group based on a CU mask indicating a portion of the n×m bits of data from the associated memory macro-block the respective CU is to receive.

17. The method of claim 12, further comprising accessing data from a respective neighboring memory macro-block during a portion of a memory access operation.

18. The method of claim 17, determining an address from the respective neighboring memory macro-block for two or more CUs in the associated CU group in a single cycle.

19. The method of claim 12, further comprising accessing data from one of a plurality of neighboring memory macroblocks during a portion of a memory access operation.

* * * * *